United States Patent
Shumaker et al.

(10) Patent No.: US 8,606,296 B1
(45) Date of Patent: Dec. 10, 2013

(54) METHOD AND SYSTEM FOR OPTIMIZING LARGE FILE TRANSFERS WHILE MOVING THROUGH NODES ON A WIRELESS NETWORK

(71) Applicant: International Business Machines, Armonk, NY (US)

(72) Inventors: Spenser Edward Shumaker, Raleigh, NC (US); Erik Bradley Craig, Raleigh, NC (US); Daniel Brian Varga, Raleigh, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/644,981

(22) Filed: Oct. 4, 2012

(51) Int. Cl.
*H04W 24/00* (2009.01)
*H04W 4/00* (2009.01)

(52) U.S. Cl.
USPC .................................. 455/456.1; 455/422.1

(58) Field of Classification Search
USPC ...................................................... 455/456.1
See application file for complete search history.

(56) References Cited

U.S. PATENT DOCUMENTS

| | | | |
|---|---|---|---|
| 5,572,221 | A | 11/1996 | Marlevi et al. |
| 5,825,759 | A | 10/1998 | Liu |
| 7,948,931 | B2 | 5/2011 | Shu et al. |
| 8,031,595 | B2 | 10/2011 | Hamilton, II et al. |
| 2002/0155844 | A1 | 10/2002 | Rankin et al. |
| 2010/0323715 | A1 | 12/2010 | Winters |

*Primary Examiner* — Temica M Beamer
*Assistant Examiner* — Joel Ajayi
(74) *Attorney, Agent, or Firm* — David A. Mims, Jr.; Darcell Walker

(57) ABSTRACT

A method and system identifies a data file for transfer to a user. The invention also detects the movement of the user device from which the data file transfer was made and calculates a projected path for movement of the user device. Based on the projected path of movement, the sections of the requested data file are transferred in parallel to node areas where the user device is projected to move according to the projected path. As the user enters a node area, the section of the data file downloaded to that node area is locally transferred to the user device and thereby substantially reducing download time of a large data file.

11 Claims, 5 Drawing Sheets

METHOD AND SYSTEM FOR OPTIMIZING LARGE FILE TRANSFERS WHILE MOVING THROUGH NODES ON A WIRELESS NETWORK

FIELD OF THE INVENTION

This invention relates to a method and system that reduces the amount of data being transmitted over cellular networks which will decrease the amount of bandwidth required to perform data transmissions. In particular, this invention relates to a method and system for optimizing the transfer of large files to a receiving device while the receiving device is moving through multiple node areas on a wireless communication network.

BACKGROUND OF THE INVENTION

Cellular telephones are an integral part of society today. A substantial number of people throughout the world have and use cellular telephones. For many people, the cellular telephone is their primary means of communicating, and of receiving and sending information. Individuals use cellular telephones for personal business and also in the work environment to conduct business matters. Cellular telephones have become a convenient means to take pictures, record events and save and retain information. As technological advancements with regards to the cellular telephone occur, more features are available on the cellular telephone. People easily find new uses for the cellular telephone based on the new features. Many consumers pre-order the latest cellular telephone devices and often, there are long lines of consumer waiting to be the first to have the new devices with the latest technology.

Currently, with all of the new technical developments and the expanded uses for small mobile electronic devices, the cellular telephone industry is going through a major transition. Most of the original usage of cellular phones was voice usage. People used cellular phones to conduct verbal communication. A main type of cellular phone was the "feature" phone. These earlier phones did not have big screens and many of the current features and they were used primarily to make telephone calls. Today, there is the 'smart' phones. The current cellular phone devices have many more features than original cellular phones. As a result, people are finding more uses for these phones. Further, where the primary use of original cellular phones was voice, today people are using their cellular phone devices to transmit data (i.e. text and images). In fact, usage of cellular phones is becoming more to transmit data than voice. This shift in usage from voice to data is creating a challenging situation for the cellular phone network providers. The original design of cellular networks did not anticipate the increasing transmission of data. The increase in data traffic places a strain on the cellular network operations.

A conventional cellular network configuration 100 shown in FIG. 1 has antennas, radios and logic 102. The area 104 of each antenna device 102 is referred to the 'Node'. The cellular telephone devices 106 communicate with and through the cellular network through the antennas in the specific Node areas. Each node area also has a server computing device 108. In the cellular network 100, these server devices 108 communicate with a Core Radio Node Controller (RNC) 110. One RNC 110 may have connected to it a hundred Nodes 104. The connection between the Node B and RNC can be through a microwave link 112. Next the RNC can further connect to the core network. The core network can also have several RNCs connected to it. Because these communication links 110 between the RNC and the nodes and even a core network are microwave links, there is a limited amount of bandwidth available to transmit information across these microwave links. These communication links have plenty of bandwidth to transmit voice communications. However, with the increased use of data-driven applications such as browsing the web, texting and watching videos via their cellular phones, the bandwidth on these microwave links is approaching the capacity of use.

The cellular telephone design and the cellular telephone protocols are designed to enable a cell phone user to roam through a cellular network. Referring to FIG. 2, a cellular network 200 is comprised of several little cells 202. A user can transparently move from one cell to another cell. The user is not disturbed as they move between cells. In some locations, such as metropolitan areas, a cellular phone user can be in one location and can switch cell sites every few seconds and not notice. The cellular network addresses all of the switching from one cell to another cell for the user.

When a user is on a wireless network, whether it is a cellular telephone data network or WIFI network, many times towers 102 and access points are not being utilized to their full potential. Due to this fact, tower wireless networks remain basically unintelligent. Current technologies allow users to seamlessly travel from one access point to another without noticing any interruptions in service activities. However, with regards to downloading large data files interruptions can occur when moving from one access point (antenna tower) to another access point.

U.S. Pat. No. 7,697,508 to Hernandez-Mondragon, et al. describes a system for communication between a mobile node and a communications network for use with a communications network having one or more communications network nodes. This invention defines a foreign agent and communicates with the mobile node in a predefined region. The system includes a ghost-foreign agent that advertises a foreign agent so that the mobile node is aware of the foreign agent when the mobile node is located outside the predefined region. The system further includes a ghost-mobile node that signals the foreign agent in response to the foreign agent advertising and based upon a predicted future state of the mobile node.

U.S. Patent Application Publication No. 20100323715 describes technologies that are generally related to predicting future mobile device locations and using the predictive information to optimize mobile communications service parameters. Mobile device locations may be predicted using real-time device location information, destination information, and location history. Predicted location information for a given device, and possibly other devices as well, may be used to adjust mobile communications service parameters such as handoffs, channel assignment, multipath fading response parameters, data rates, transmission modes, opportunistic scheduling parameters, location-based services, and location update rates.

Although these technologies do enhance the communications of electronic devices, there remains a need for a more seamless communication system that can optimize large file transfers while moving through nodes on a wireless network.

SUMMARY OF THE INVENTION

The present invention addresses the problem of interruptions when transferring large files while a user is moving across nodes of a wireless network. This invention comprises a method of analyzing the moving patterns of end users inside a wireless access point's zone to predict when and where the user will transfer to the next wireless node. This invention pro-actively downloads streamed content to the next wireless node before the user switches, thereby enabling direct transfer of content from the next node to the mobile device once the user switches towers. In practice, user movement is detected and a pattern of movement is determined. From this determination there is a prediction or projection of the path of the user. Based on the movement of the user, size of the file that is being transferred and the transfer rate, the present invention can predict the amount of a file that will be transferred to a user while the user is in a certain node area. Also predicted is the next (future) node of the user and the amount of the file that would be transferred to the user in that node area. Based on these predictions, the present invention will begin to download to the future node the future node the portion of the file that is calculated to be downloaded to the user once the user is in that node area. When the user reaches the future node area, the downloaded portion of the file is transferred from a stored location in the future node area to the user. Since this transfer is local, little bandwidth is required and the transfer is substantially faster.

DETAILED DESCRIPTION OF THE INVENTION

The method and system of the present invention provide a means to provide seamless transfer of large files across network nodes without interruptions of awareness by user. The objective of the present invention is accomplished by determining the size of a file to be transferred to a user, predicting the path of the user and portioning and transmitting the file portions to the node areas where the user will be at the time that portion of the file is to be downloaded to the user. When the user reaches the defined node area, the download transmission will be from the local node to the user. In practice, the present invention provides a parallel transfer of sections of a large file to predetermined nodes and a sequential transfer to a user from each node as the user reaches that particular node area. Local transfers within a node are much faster than network transfers.

Figure 1:
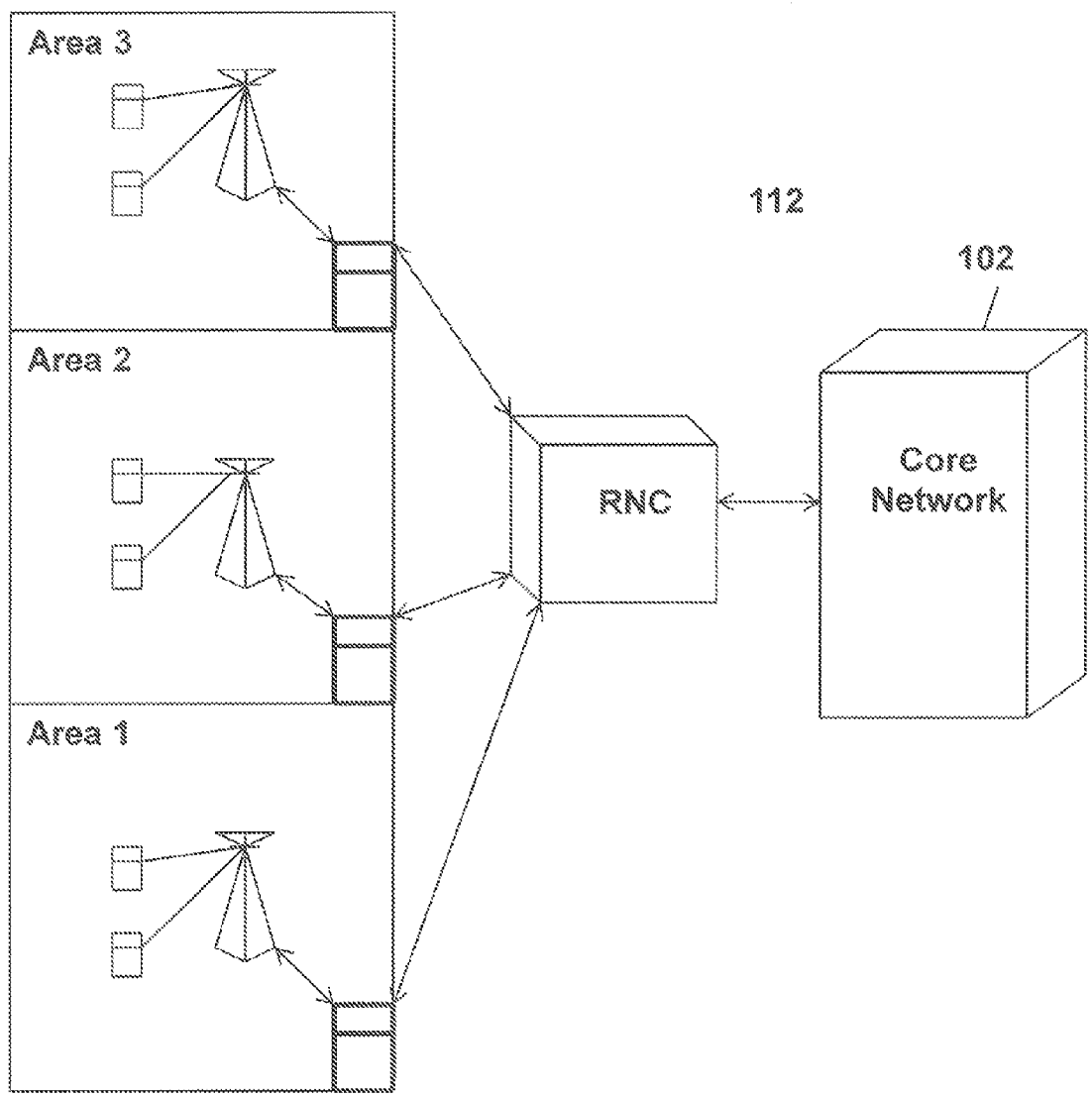
FIG. 1 is an illustration of a cellular network configuration containing a network core, radio node controller (RNC) and multiple Node B cell sites.
Figure 2:
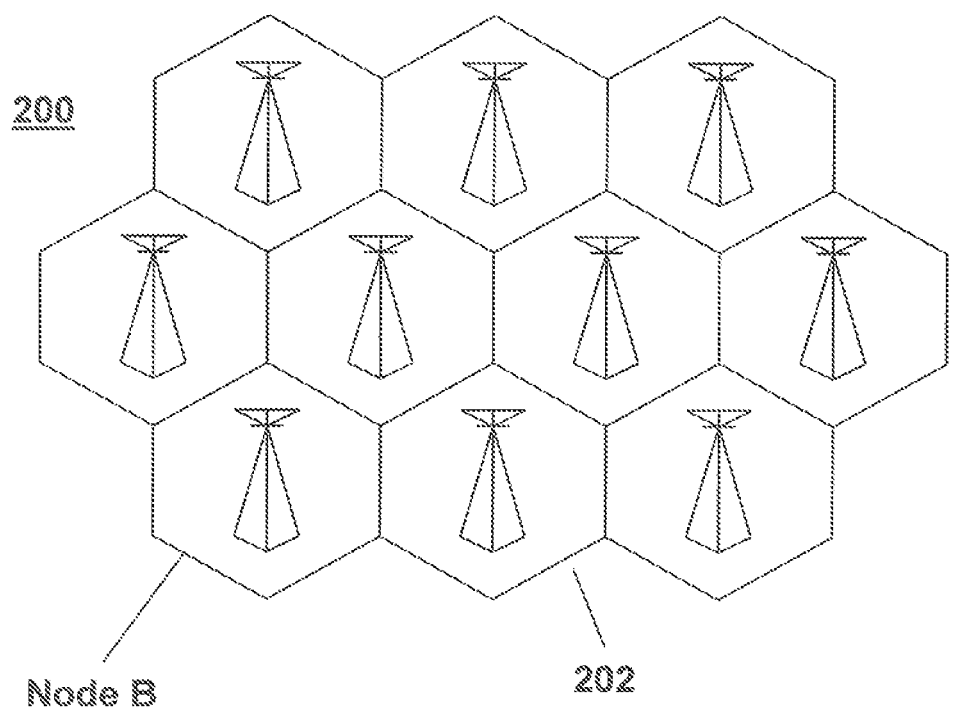
FIG. 2 is a display of several Node B cell sites comprising a network of adjacent cellular sites, each cell site having an antenna, radio and logic.
Figure 3:
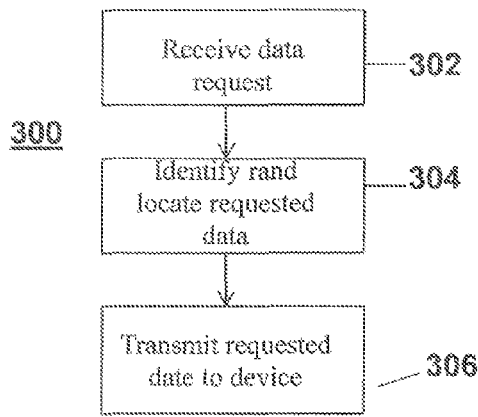
FIG. 3 is a flow diagram of the steps in a general implementation of the method of the present invention.

Referring to FIG. 3, shown is a flow diagram 300 of the concept of the present invention. In the present invention, a user makes a request for data in step 302. This data request could be for various types of data such as video, audio or data files. Once there a detected data request, step 304 identifies the location of the requested data file. This located data is then retrieved at the core of node controller 110. Step 306 then transmits the requested and retrieved data to the requesting device.

Figure 4:
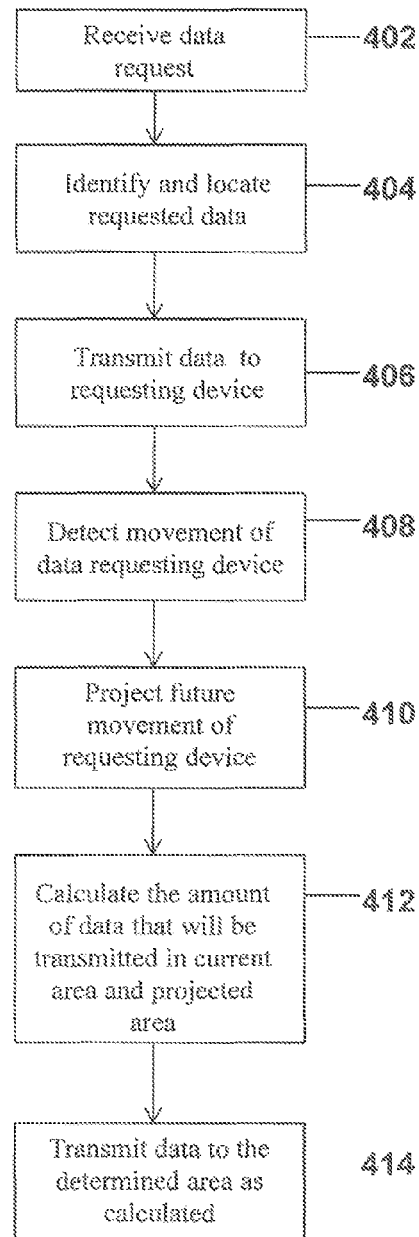
FIG. 4 is a flow diagram of the steps in the implementation of the method of the present invention for optimizing of large file transfers across multiple nodes.

The distinction of the present invention is found in during the retrieval of the information and the transmittal of the information in step 306. Referring to FIG. 4, shown is a more detailed description of the method of the present invention. In step 402, again a user makes a request for data. Once the data request is received at the network core or node controller 110, in step 404, the requested data is identified, located and retrieved at the network core or node controller. At this point, step 406 begins the download of the requested data to the requesting device. As the download transmission of the requested data file begins, step 408 begins to monitor the movement of the user device receiving the requested data. When movement of the user device receiving is detected, step 410 begins the process of predicting the future path that the user will travel. This prediction involves identifying the direction of the user device and the speed at which the user device is moving. In this process, the identity of the area where the user is currently located along with the physical size of that area is also considered during the process of determining the path the user is traveling and the amount of time the user will be in that current zone. With information gather from step 410, step 412 begins to calculate the section of the data sections that should be transmitted to each node area present and future in which the user device will be in during the download transmission of the requested data. At this point, step 414 beings parallel transmission of sections of the requested data file.

Figure 5:
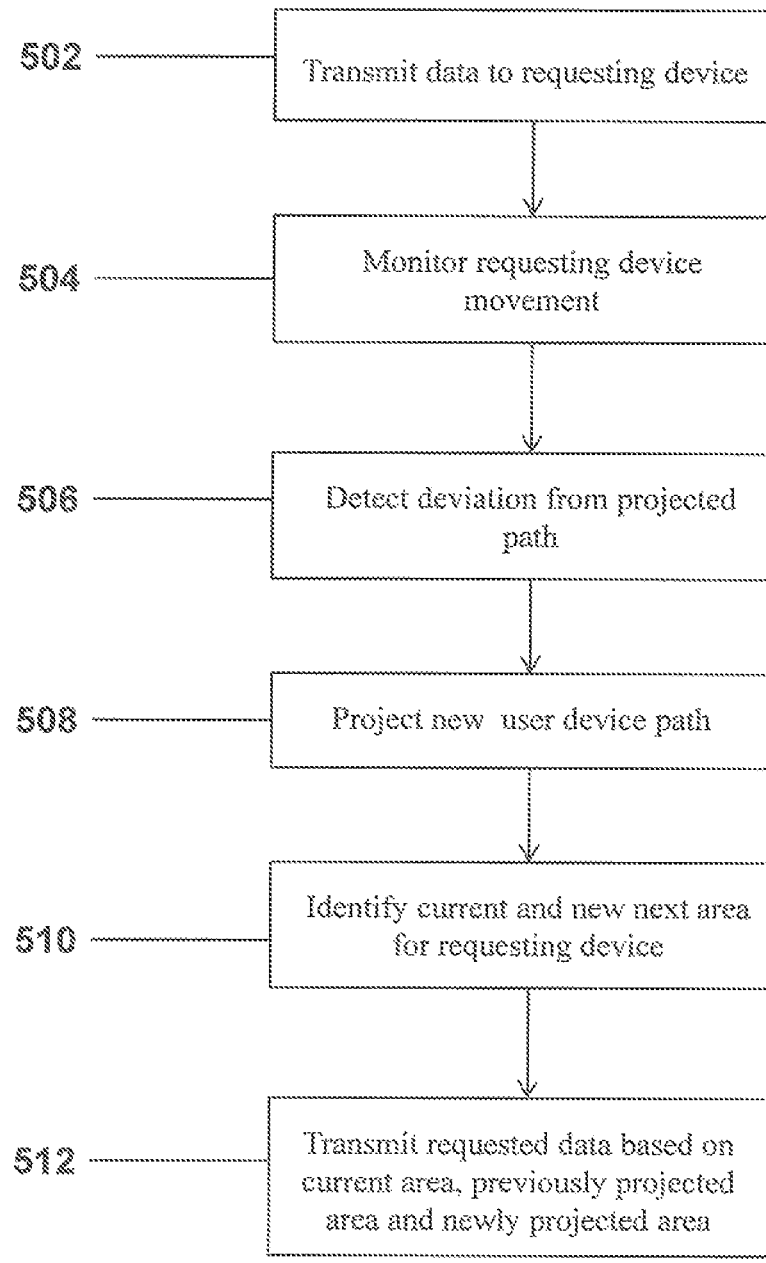
FIG. 5 is an alternate flow diagram of the steps in the implementation of the method of the present invention when a user deviates from a predicted pattern of movement.

In some instances, the method of the present invention will project the path of a user. However, the user may deviate from the projected path. In this event, the method of the present invention will need to recalculate the projected path and calculate a new path for the user. FIG. 5 is an alternate flow diagram of the steps in the implementation of the method of the present invention when a user deviates from a predicted pattern of movement. The steps in FIG. 5 continue from the data transmission step 414. In this method, step 502 continues to monitor the movement of the user device as date is being downloaded. In this monitoring process, the actual movement of the user device is compared to the projected path. As part of this monitoring process, the movement paths are continually calculated and compared with the projected path. When the deviation of the comparison reached a predetermined threshold, a path deviation alert is triggered in step 504. The deviation trigger will consider whether the detected path deviation will result in the user moving to a node area that is not in the initial or previous path projection. Once there is an alert of a path deviation, step 506 calculates a new path. Based on the newly calculated path, the download of the data could be modified. In addition, based on a newly calculated projection, data downloaded to one node area may be transferred to another node area if the determination is that the user will in the new node area. In this method, step 508 will calculate a new projected path and next node area. At this point, after the newly calculated projected path, the data is transferred to the node area in step 510 according to the newly projected path.

Figure 6A:
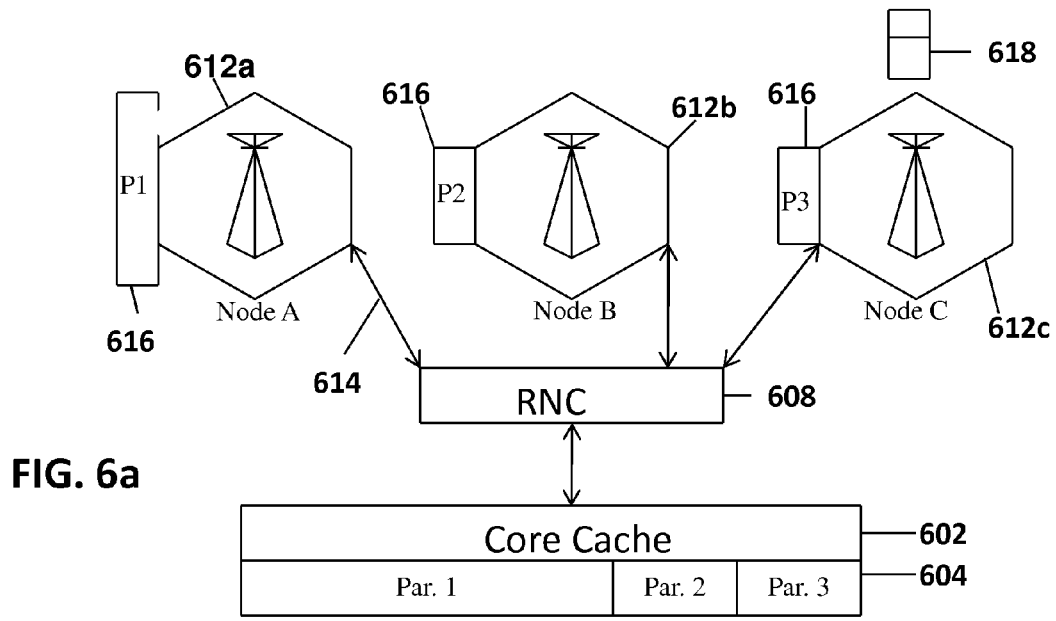
FIGS. 6a and 6b are illustrations of the transmission of data being transmitted in sections to various nodes.
Figure 6B:
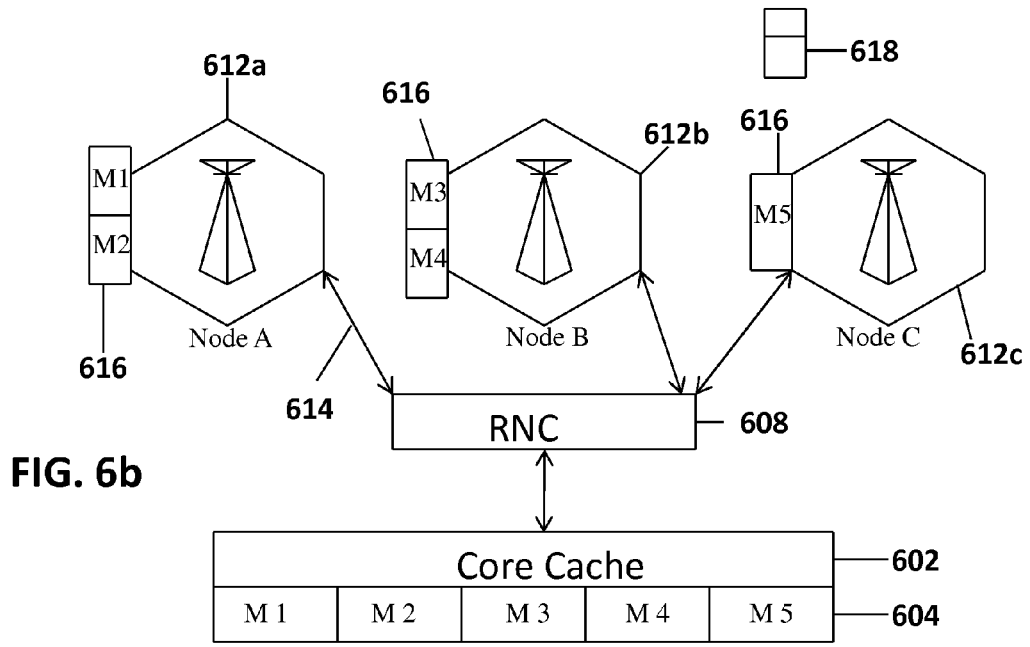

Referring to FIGS. 6a and 6b, show are illustrations of the transmission of requested data being transmitted in sections to various nodes that are in the path of the projected movement of the mobile cellular device making the initial data request. FIG. 6a shows various nodes 612a, 612b and 612c. Each node is in communication with the Radio Network Controller (RNC) 608 via communication links 614. The RNC 608 is also in communication with a core cache memory 602. This core cache holds the data requested by the mobile cellular device and retrieved by the network core device. As mentioned, when a request is made from a mobile cellular device 618, the network core device retrieves the requested data and begins the process of transmitting the requested data to the requesting device. As part of the transmission, as previously mentioned, there is first a determination of the movement of the requesting device, then a projection of the path in which the device is moving. Also, there is the determination of the speed of the movement and the speed of any downloads to the requesting device. Based on this information, there is a determination of the how to divide up the requested for simultaneous transmission to node through which the requesting device will travel. The data is divided into sections and can be stored in a cache memory 602. The cache memory stores the various sections of the requested data 604.

As shown in FIG. 6a, the division of the requested data is between three nodes. The first part of the requested data P1 can be transmitted to the requesting device while the device is in node are 612a. This transmission equals approximately sixty percent (60%) of the total data request down. The various sections or parts of the data may be different sizes again based on the size of data download, the download rate, and the speed at which the cellular device is moving through the node area and amount of the node area the cellular device will move through. The transmission of the requested data can be simultaneously transmitted to the cache such that each data section is transmitted to the requesting device when that device enters the particular node area. FIG. 6b shows a different division of the requested data. In this division, nodes 612a and 612b each have substantially the same amount of data to download when the requesting device enters the particular node areas. Node 612c has a lesser section of download. In addition, depending on the size of the data download, not every node area in a projected path will have data to download to a requesting device. Also as mentioned, the simultaneous transmission of the requested data to various node areas, reduced the bandwidth demand of the communication links 614 during the transmission of a requested data download.

Below is an example of the implementation of the steps of the present invention.

1. Moving patterns of a mobile user are analyzed, such that the system knows when and where the user will switch from tower A to tower B.
2. When tower switch is pending, tower A communicates in-process downloads to tower B. The system may communicate the progress of in-process downloads at varying levels of granularity.
3. Tower B pro-actively retrieves and caches the remaining portion of the mobile device's download from the internet, as communicated from tower A.
4. When the mobile device switches from tower A to tower B, cached content is directly transferred to the mobile device. For example, consider a passenger is streaming a TV show from Netflix on their mobile device while driving:
   1. A mobile device begins a download on tower A. The file requested is 100 MB
   2. Tower A is downloading the data and buffering 2-10 MB, 1 MB already to the device
   3. The system determines when and where the user will switch to tower B.
   4. Tower A tells tower B information about the download (size, speed, current spot).
   5. Tower B begins downloading the file at 75 MB, based upon the criteria above (mobile device is still in tower A's space)
   6. Just before the mobile device switches to tower B, tower A may transfer its unconsumed buffer to tower B (see supporting art above).
   7. Mobile switches from tower A to tower B, the caches are combined (some gaps could get filled if the calculations were not 100% accurate) and the remaining part of the file is now completely cached in tower B.
   8. Tower B may directly stream its cache to the user's mobile device when the device switches to tower B.
   9. The end user receives an enhanced connectivity experience since content has been pre-cached at its network tower.

As a result of this invention, the end user perceives improved network connectivity since content has been cached locally at the next tower for direct transfer.

It is important to note that while the present invention has been described in the context of a fully functioning cellular network system, those skilled in the art will appreciate that the components and processes of the present invention are capable of being distributed in the form of instructions in a computer readable storage medium and a variety of other forms, regardless of the particular type of medium used to carry out the distribution. The method of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

We claim:

1. A system for optimizing large file transfers while moving through nodes on a wireless network comprising:
    an electronic mobile cellular device capable of receiving and transmitting voice and data communications;
    one or more network devices, each network device having an antenna and communication logic and being capable of establishing a communication link with said electronic mobile cellular devices;
    a network core device capable of gathering, storing and transmitting requested data to an electronic mobile cellular device, said network core device also having the capability to detect movement of an electronic mobile cellular device and to calculate a projected movement path for the electronic mobile cellular device and having the capability to determine a specific number of sections in which to divide requested data, based on the projected movement path of the mobile cellular device which initiated a data request; and
    a cache memory device for temporarily storing requested data transmitted from said network core device and for transmitting the stored transmitted data to an electronic mobile cellular device requesting the transmitted data.

2. The system as described in claim 1 further comprising a radio network controller (RNC) which establishes communications between said network devices.

3. A method for optimizing large file transfers while moving through nodes on a wireless network comprising:
    receiving a data request at a network core device from a mobile cellular device;
    identifying and locating data of the received data request;
    determining whether the mobile cellular device making the requesting is moving;

when the determination is that the mobile cellular device is moving, projecting a path for which the mobile cellular device will move;

identifying node areas through which the mobile cellular device will travel based on the projected path;

determining a number of sections in which to divide the requested data for transmission, a determined section of the data to be transmitted to an identified and designated node in the projected path of the mobile cellular device, each identified and designated node area being based on the projected movement path of the mobile cellular device; and simultaneously transmitting the determined sections of the data to each identified and designated node area in the projected movement path of the mobile cellular device.

4. The method as described in claim 3 wherein said determining a number of sections in which to divide the requested data further comprises:

calculating a size of the requested data;

determining a download speed for the requested;

determining an amount of time the mobile cellular device will be in each node area;

determining an amount of the requested data that can be downloaded to the mobile cellular device when the mobile cellular device is in each node area; and dividing the requested data into sections based on the amount of data that can be downloaded to the mobile cellular device when the mobile cellular device is in each node area.

5. The method as described in claim 3 wherein the requested data is a data file.

6. The method as described in claim 3 wherein said simultaneous transmitting of the determined sections of the data further comprises:

transmitting each section of the requested data to a cache memory associated with each identified node area and storing that transmitted section of the requested data in that cache memory; and downloading the section of the requested stored in that cache memory to the requesting mobile cellular device when the requesting mobile cellular device is in that identified node area.

7. The method as described in claim 3 further comprising after said simultaneously transmitting the determined sections of the data to each identified and designated node area in the projected movement path of the requesting mobile cellular device:

monitoring movement of the requesting mobile cellular device;

detecting a deviation in the projected path of the requesting mobile cellular device;

projecting a new path through which the mobile cellular device will move;

identifying node areas through which the mobile cellular device will travel based on the new projected path; and adjusting the transmission of the determined sections of the data based on the new projected path.

8. The system as described in claim 1 wherein a said cache memory device further comprises a plurality of cache memory devices, one of each said cache memory devices being positioned in a said network device.

9. The system as described in claim 8 wherein said plurality of cache memory devices is in communication with said network core device.

10. The system as described in claim 1 wherein said network core device further comprises a software module capable of calculating an amount of data from the requested data for transmission to each of one or more network devices based on a projected movement path of the electronic mobile cellular device which initiated a data request.

11. A system for optimizing large file transfers while moving through nodes on a wireless network comprising:

an electronic mobile cellular device capable of receiving and transmitting voice and data communications;

one or more network devices, each network device having an antenna and communication logic and being capable of establishing a communication link with said electronic mobile cellular devices;

a network core device capable of gathering, storing and transmitting requested data to an electronic mobile cellular device, said network core device also having the capability to detect movement of an electronic mobile cellular device and to calculate a projected movement path for the electronic mobile cellular device;

a software module in the network core device capable of calculating an amount of data from the requested data for transmission to each of one or more network devices based on a projected movement path of the electronic mobile cellular device which initiated a data request; and a cache memory device for temporarily storing requested data transmitted from said network core device and for transmitting the stored transmitted data to an electronic mobile cellular device requesting the transmitted data.

* * * * *